(12) United States Patent
Murphy et al.

(10) Patent No.: US 9,418,292 B2
(45) Date of Patent: Aug. 16, 2016

(54) METHODS, APPARATUSES, AND COMPUTER PROGRAM PRODUCTS FOR RESTRICTING OVERLAY OF AN AUGMENTATION

(75) Inventors: David Murphy, Helsinki (FI); Tuomas Vaittinen, Helsinki (FI); André Tadeu Santos Fialho, Berlin (DE)

(73) Assignee: HERE GLOBAL B.V., Eindhoven (NL)

( * ) Notice: Subject to any disclaimer, the term of this patent is extended or adjusted under 35 U.S.C. 154(b) by 877 days.

(21) Appl. No.: 13/252,531

(22) Filed: Oct. 4, 2011

(65) Prior Publication Data
US 2013/0084012 A1   Apr. 4, 2013

(51) Int. Cl.
*G06K 9/00* (2006.01)
*G06T 19/00* (2011.01)

(52) U.S. Cl.
CPC .......... *G06K 9/00671* (2013.01); *G06T 19/006* (2013.01)

(58) Field of Classification Search
USPC .......................... 382/118, 176, 180, 195, 209
See application file for complete search history.

(56) References Cited

U.S. PATENT DOCUMENTS

| | | | |
|---|---|---|---|
| 5,845,008 A | 12/1998 | Katoh et al. | |
| 7,027,101 B1 * | 4/2006 | Sloo et al. | 348/564 |
| 2003/0142068 A1 | 7/2003 | Deluca et al. | |
| 2004/0165000 A1 | 8/2004 | Nagahashi et al. | |
| 2005/0231532 A1 | 10/2005 | Suzuki et al. | |
| 2006/0198555 A1 | 9/2006 | Hosotsubo | |
| 2008/0138030 A1 | 6/2008 | Bryan et al. | |
| 2009/0016449 A1 * | 1/2009 | Cheung et al. | 375/240.29 |
| 2011/0096093 A1 | 4/2011 | Oi et al. | |
| 2011/0102460 A1 | 5/2011 | Parker | |
| 2011/0128384 A1 | 6/2011 | Tiscareno et al. | |
| 2011/0214082 A1 | 9/2011 | Osterhout et al. | |
| 2011/0287811 A1 | 11/2011 | Mattila et al. | |
| 2012/0105475 A1 | 5/2012 | Tseng | |
| 2013/0088516 A1 | 4/2013 | Ota et al. | |

FOREIGN PATENT DOCUMENTS

| | | |
|---|---|---|
| EP | 1 641 238 A1 | 3/2006 |
| EP | 2715521 A1 | 4/2014 |
| JP | 2006343953 A | 12/2006 |
| JP | 2010238098 A | 10/2010 |

(Continued)

OTHER PUBLICATIONS

International Search Report and Written Opinion for Application No. PCT/IB2012/055317, dated Jun. 28, 2013.

(Continued)

*Primary Examiner* — Wesley Tucker
(74) *Attorney, Agent, or Firm* — Alston & Bird LLP (57) ABSTRACT

Methods and apparatuses are provided for restricting overlay of an augmentation. A method may include evaluating a feature space representation of an image for presence of a predefined feature pattern. The method may further include recognizing, based at least in part on the evaluating, that the predefined feature pattern is present in the feature space representation of the image. The method may additionally include, in response to recognizing that the predefined feature pattern is present in the feature space representation of the image, restricting overlay of an augmentation on a portion of the image corresponding to the recognized predefined feature pattern. Corresponding apparatuses are also provided.

20 Claims, 4 Drawing Sheets

(56) References Cited

FOREIGN PATENT DOCUMENTS

| JP | 2011076207 A | 4/2011 |
|---|---|---|
| JP | 2013080394 A | 4/2011 |
| JP | 2011134173 A | 7/2011 |
| WO | WO 02/13520 A1 | 2/2002 |
| WO | WO 2009/141201 A1 | 11/2009 |
| WO | WO-2010128329 A2 | 11/2010 |
| WO | WO 2010/150249 A1 | 12/2010 |
| WO | WO-2011145429 A1 | 11/2011 |

OTHER PUBLICATIONS

ProSieben Mobile AR Quiz in a TV show; [Online]; [Retrieved on Sep. 28, 2011]; Retrieved from the Internet <URL:http://www.metaio.com/projects/mobile/prosieben-galileo-smart/>; 1 page.

EURion constellation—Wikipedia, the free encyclopedia; [Online]; [Retrieved on Sep. 21, 2011]; Retrieved from the Internet <URL:http://en.wikipedia.org/wiki/EURion_constellation>; 5 pages.

Feature detection (computer vision)—Wikipedia, the free encyclopedia; [Online]; [Retrieved on Sep. 22, 2011]; Retrieved from the Internet <URL:http://en.wikipedia.org/wiki/Feature_detection_(computer_vision)>; 5 pages.

Fast Corner Detection—Edward Rosten; [Online]; Retrieved from the Internet <URL:http://mi.eng.cam.ac.uk/~er258/work/fast.html>; Updated Jul. 14, 2011; 5 pages.

"Mini—Augmented Reality Ad", Dec. 15, 2008, retrieved from https://www.youtube.com/watch?v=dBser6_gToA on May 20, 2016.

Chehimi, Fadi, et al., "Augmented Reality 3D Interactive Advertisements on Smartphones", *Proceeding of the International Conference on the Management of Mobile Business*, Jul. 9-11, 2007, pp. 21-21 (abstract only), IEEE, U.S.A.

European Patent Office, Extended European Search Report for Application No. 12837813.0, Mar. 31, 2016, 12 pages, Germany.

\* cited by examiner

METHODS, APPARATUSES, AND COMPUTER PROGRAM PRODUCTS FOR RESTRICTING OVERLAY OF AN AUGMENTATION

TECHNOLOGICAL FIELD

Example embodiments of the present invention relate generally to computing interface technology and, more particularly, relate to methods, apparatuses, and computer program products for restricting overlay of an augmentation.

BACKGROUND

The modern communications era has brought about a tremendous expansion of wireline and wireless networks. Wireless and mobile networking technologies have addressed related consumer demands, while providing more flexibility and immediacy of information transfer. Concurrent with the expansion of networking technologies, an expansion in computing power has resulted in development of affordable computing devices capable of taking advantage of services made possible by modern networking technologies. This expansion in computing power has led to a reduction in the size of computing devices and given rise to a new generation of mobile devices that are capable of performing functionality that only a few years ago required processing power that could be provided only by the most advanced desktop computers. Consequently, mobile computing devices having a small form factor have become ubiquitous and are used to access network applications and services by consumers of all socioeconomic backgrounds.

Some platform and application developers are leveraging the power of modern mobile computing devices and mobile networking technologies to provide a variety of services to mobile computing device users. One such example service is augmented reality. In this regard, mobile computing devices may, in some situations, enhance the interaction that users have with their environment. Augmented reality involves the merging of real and virtual worlds. In some cases, augmented reality involves mixing real world image data with overlaid virtual objects in order to produce environments and visualizations in which physical and digital objects co-exist and potentially also interact in real time.

When incorporating augmented reality into a particular application or scenario, a user may be enabled to capture a live view of the world and then add information to the view. A very common example of augmented reality is experienced frequently when watching a sporting event on television with streaming or otherwise intermittently presented score or other status information being overlaid onto the video of the sporting action itself. Another example use of augmented reality is the provision of a virtual tour guide, which may provide additional information about an environment in which a user is located by adding virtual content about real world locations to images of those locations.

BRIEF SUMMARY

Methods, apparatuses, and computer program products are herein provided for restricting overlay of an augmentation. Methods, apparatuses, and computer program products in accordance with various embodiments may provide several advantages to computing devices, content providers, and computing device users. Some example embodiments provide computing devices configured to recognize a predefined feature pattern in a feature space representation of an image. In response to recognizing the predefined feature pattern, computing devices provided by some such example embodiments are configured to restrict overlay of an augmentation on a portion of the image corresponding to the recognized predefined feature pattern. Accordingly, a predefined feature pattern may be embedded in a real world image or object, such that when an image is captured of the real world image or object in an augmented reality mode, overlay of an augmentation on the image or object containing the predefined feature pattern may be restricted. In this regard, some example embodiments may provide for restriction of overlay of an augmentation on an advertisement, logo, and/or the other real world object for which it may be undesirable to overlay an augmentation by integrating a recognizable predefined feature pattern into the real world object. In some example embodiments, the predefined feature pattern may comprise a feature pattern that may be integrated into an object in a manner that it may be recognizable through computer vision techniques, but may not perceptibly alter the object to the human eye.

Various example embodiments may be used to facilitate restriction of augmentation on various real world structures, such as on billboards, buildings, and/or the like that may be viewed on an augmented reality apparatus. Additionally or alternatively, some example embodiments may be applied to facilitate restriction of augmentation on various forms of media. For example, predefined feature patterns may be embedded within newspapers, magazines, and/or other printed media to facilitate restriction of augmentation when the printed media is viewed using an augmented reality apparatus. As another example, some example embodiments may leverage predefined feature patterns for television broadcasts, such as to control the overlay of sponsor logos, sports scores, news headlines, and/or other augmentations.

In a first example embodiment, a method is provided, which comprises evaluating a feature space representation of an image for presence of a predefined feature pattern. The method of this example embodiment further comprises recognizing, based at least in part on the evaluating, that the predefined feature pattern is present in the feature space representation of the image. The method of this example embodiment additionally comprises, in response to recognizing that the predefined feature pattern is present in the feature space representation of the image, restricting overlay of an augmentation on a portion of the image corresponding to the recognized predefined feature pattern.

In another example embodiment, an apparatus comprising at least one processor and at least one memory storing computer program code is provided. The at least one memory and stored computer program code are configured, with the at least one processor, to cause the apparatus of this example embodiment to at least evaluate a feature space representation of an image for presence of a predefined feature pattern. The at least one memory and stored computer program code are configured, with the at least one processor, to further cause the apparatus of this example embodiment to recognize, based at least in part on the evaluation of the feature space representation of the image, that the predefined feature pattern is present in the feature space representation of the image. The at least one memory and stored computer program code are configured, with the at least one processor, to additionally cause the apparatus of this example embodiment, in response to recognizing that the predefined feature pattern is present in the feature space representation of the image, to restrict overlay of an augmentation on a portion of the image corresponding to the recognized predefined feature pattern.

In a further example embodiment, a computer program product is provided. The computer program product of this example embodiment includes at least one computer-readable storage medium having computer-readable program instructions stored therein. The program instructions of this example embodiment comprise program instructions configured to evaluate a feature space representation of an image for presence of a predefined feature pattern. The program instructions of this example embodiment further comprise program instructions configured to recognize, based at least in part on the evaluation of the feature space representation of the image, that the predefined feature pattern is present in the feature space representation of the image. The program instructions of this example embodiment also comprise program instructions configured, in response to recognizing that the predefined feature pattern is present in the feature space representation of the image, to restrict overlay of an augmentation on a portion of the image corresponding to the recognized predefined feature pattern.

In yet another example embodiment, an apparatus is provided that comprises means for evaluating a feature space representation of an image for presence of a predefined feature pattern. The apparatus of this example embodiment further comprises means for recognizing, based at least in part on the evaluation of the feature space representation of the image, that the predefined feature pattern is present in the feature space representation of the image. The apparatus of this example embodiment additionally comprises means for, in response to recognizing that the predefined feature pattern is present in the feature space representation of the image, restricting overlay of an augmentation on a portion of the image corresponding to the recognized predefined feature pattern.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the invention in any way. It will be appreciated that the scope of the invention encompasses many potential embodiments, some of which will be further described below, in addition to those here summarized.

BRIEF DESCRIPTION OF THE DRAWING(S)

Having thus described embodiments of the invention in general terms, reference will now be made to the accompanying drawings, which are not necessarily drawn to scale, and wherein:

DETAILED DESCRIPTION

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

As used herein, the terms "data," "content," "information" and similar terms may be used interchangeably to refer to data capable of being transmitted, received, displayed and/or stored in accordance with various example embodiments. Thus, use of any such terms should not be taken to limit the spirit and scope of the disclosure. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, and/or the like.

The term "computer-readable medium" as used herein refers to any medium configured to participate in providing information to a processor, including instructions for execution. Such a medium may take many forms, including, but not limited to a non-transitory computer-readable storage medium (e.g., non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Examples of non-transitory computer-readable media include a floppy disk, a flexible disk, hard disk, magnetic tape, any other non-transitory magnetic medium, a compact disc read only memory (CD-ROM), compact disc compact disc-rewritable (CD-RW), digital versatile disc (DVD), Blu-Ray, any other non-transitory optical medium, a random access memory (RAM), a programmable read only memory (PROM), an erasable programmable read only memory (EPROM), a FLASH-EPROM, any other memory chip or cartridge, or any other non-transitory medium from which a computer can read. The term computer-readable storage medium is used herein to refer to any computer-readable medium except transitory media. However, it will be appreciated that where embodiments are described to use a computer-readable storage medium, other types of computer-readable mediums may be substituted for or used in addition to the computer-readable storage medium in alternative embodiments.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

Figure 1:
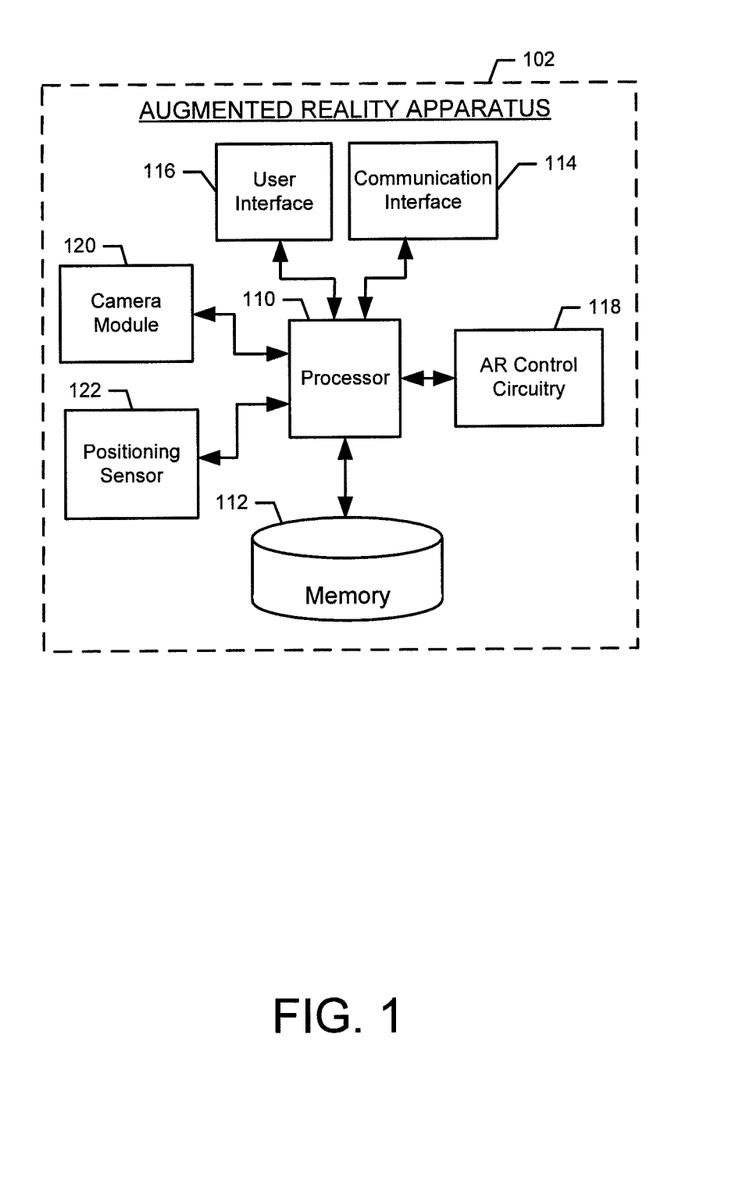
FIG. 1 illustrates a block diagram of an augmented reality apparatus for restricting overlay of an augmentation according to some example embodiments.

FIG. 1 illustrates a block diagram of an augmented reality apparatus 102 for restricting overlay of an augmentation according to some example embodiments. It will be appreciated that the augmented reality apparatus 102 is provided as an example of one embodiment and should not be construed to narrow the scope or spirit of the disclosure in any way. In this regard, the scope of the disclosure encompasses many potential embodiments in addition to those illustrated and described herein. As such, while FIG. 1 illustrates one example of a configuration of an augmented reality apparatus for restricting overlay of an augmentation, other configurations may also be used to implement embodiments of the present invention.

The augmented reality apparatus 102 may be embodied as a desktop computer, laptop computer, mobile terminal, mobile computer, mobile phone, mobile communication device, one or more servers, one or more network nodes, game device, digital camera/camcorder, audio/video player, television device, radio receiver, digital video recorder, a headset, positioning device, chipset, a computing device comprising a chipset, any combination thereof, and/or the like. In some example embodiments, the augmented reality apparatus 102 may be embodied as a mobile terminal, such as that illustrated in FIG. 2.

Figure 2:
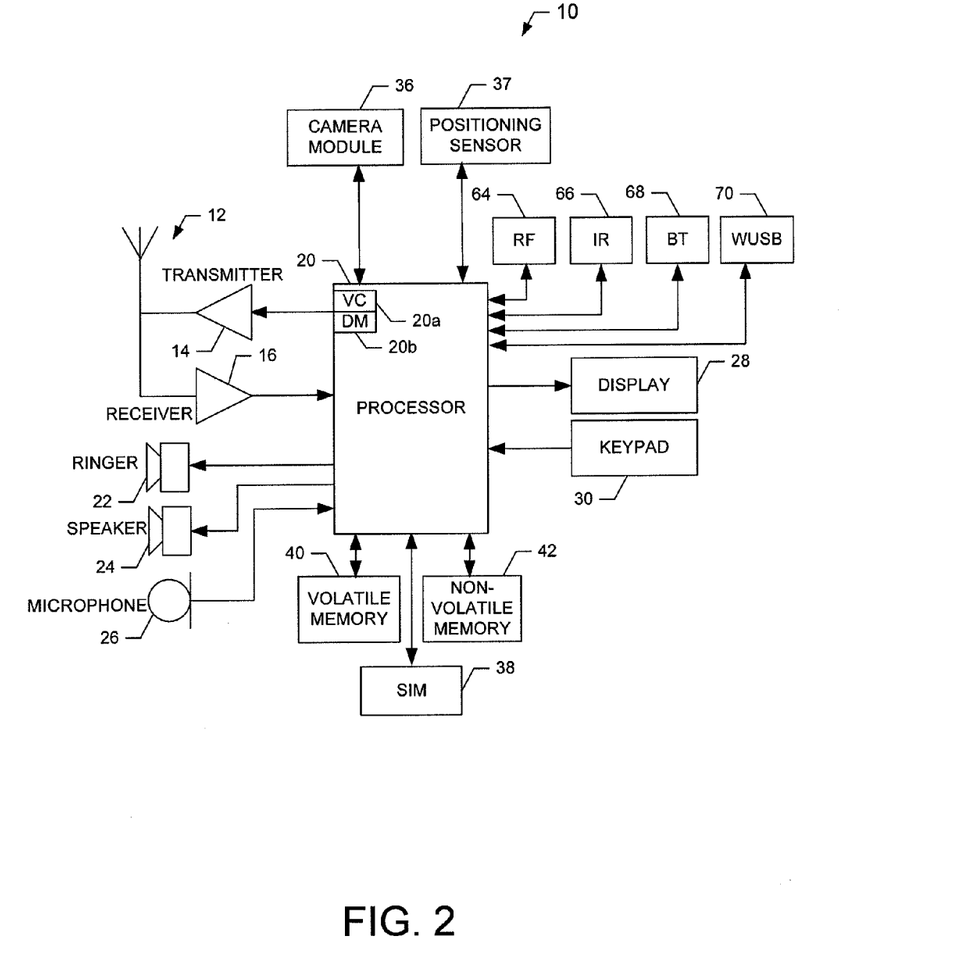
FIG. 2 is a schematic block diagram of a mobile terminal according to some example embodiments.

In this regard, FIG. 2 illustrates a block diagram of a mobile terminal 10 representative of one embodiment of an augmented reality apparatus 102. It should be understood, however, that the mobile terminal 10 illustrated and hereinafter described is merely illustrative of one type of augmented reality apparatus 102 that may implement and/or benefit from various embodiments of the invention and, therefore, should not be taken to limit the scope of the disclosure. While several embodiments of the electronic device are illustrated and will be hereinafter described for purposes of example, other types of electronic devices, such as mobile telephones, mobile computers, portable digital assistants (PDAs), pagers, laptop computers, desktop computers, gaming devices, televisions, and other types of electronic systems, may employ various embodiments of the invention.

As shown, the mobile terminal 10 may include an antenna 12 (or multiple antennas 12) in communication with a transmitter 14 and a receiver 16. The mobile terminal 10 may also include a processor 20 configured to provide signals to and receive signals from the transmitter and receiver, respectively. The processor 20 may, for example, be embodied as various means including circuitry, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some embodiments the processor 20 comprises a plurality of processors. These signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques such as Institute of Electrical and Electronics Engineers (IEEE) 802.11, 802.16, and/or the like. In addition, these signals may include speech data, user generated data, user requested data, and/or the like. In this regard, the mobile terminal may be capable of operating with one or more air interface standards, communication protocols, modulation types, access types, and/or the like. More particularly, the mobile terminal may be capable of operating in accordance with various first generation (1G), second generation (2G), 2.5G, third-generation (3G) communication protocols, fourth-generation (4G) communication protocols, Internet Protocol Multimedia Subsystem (IMS) communication protocols (e.g., session initiation protocol (SIP)), and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile terminal may be additionally capable of operating in accordance with 3.9G wireless communication protocols such as Long Term Evolution (LTE) or Evolved Universal Terrestrial Radio Access Network (E-UTRAN) and/or the like. Additionally, for example, the mobile terminal may be capable of operating in accordance with fourth-generation (4G) wireless communication protocols and/or the like as well as similar wireless communication protocols that may be developed in the future.

Some Narrow-band Advanced Mobile Phone System (NAMPS), as well as Total Access Communication System (TACS), mobile terminals may also benefit from embodiments of this invention, as should dual or higher mode phones (e.g., digital/analog or TDMA/CDMA/analog phones). Additionally, the mobile terminal 10 may be capable of operating according to Wi-Fi or Worldwide Interoperability for Microwave Access (WiMAX) protocols.

It is understood that the processor 20 may comprise circuitry for implementing audio/video and logic functions of the mobile terminal 10. For example, the processor 20 may comprise a digital signal processor device, a microprocessor device, an analog-to-digital converter, a digital-to-analog converter, and/or the like. Control and signal processing functions of the mobile terminal may be allocated between these devices according to their respective capabilities. The processor may additionally comprise an internal voice coder (VC) 20a, an internal data modem (DM) 20b, and/or the like. Further, the processor may comprise functionality to operate one or more software programs, which may be stored in memory. For example, the processor 20 may be capable of operating a connectivity program, such as a web browser. The connectivity program may allow the mobile terminal 10 to transmit and receive web content, such as location-based content, according to a protocol, such as Wireless Application Protocol (WAP), hypertext transfer protocol (HTTP), and/or the like. The mobile terminal 10 may be capable of using a Transmission Control Protocol/Internet Protocol (TCP/IP) to transmit and receive web content across the internet or other networks.

The mobile terminal 10 may also comprise a user interface including, for example, an earphone or speaker 24, a ringer 22, a microphone 26, a display 28, a user input interface, and/or the like, which may be operationally coupled to the processor 20. In this regard, the processor 20 may comprise user interface circuitry configured to control at least some functions of one or more elements of the user interface, such as, for example, the speaker 24, the ringer 22, the microphone 26, the display 28, and/or the like. The processor 20 and/or user interface circuitry comprising the processor 20 may be configured to control one or more functions of one or more elements of the user interface through computer program instructions (e.g., software and/or firmware) stored on a memory accessible to the processor 20 (e.g., volatile memory 40, non-volatile memory 42, and/or the like). Although not shown, the mobile terminal may comprise a battery for powering various circuits related to the mobile terminal, for example, a circuit to provide mechanical vibration as a detectable output. The user input interface may comprise devices allowing the mobile terminal to receive data, such as a keypad 30, a touch display (not shown), a joystick (not shown), and/or other input device. In embodiments including a keypad, the keypad may include the conventional numeric (0-9) and related keys (#, *), and other hard and soft keys used for operating the mobile terminal 10. Alternatively or additionally, the keypad 30 may include a conventional QWERTY keypad arrangement.

As shown in FIG. 2, the mobile terminal 10 may also include one or more means for sharing and/or obtaining data. For example, the mobile terminal may comprise a short-range radio frequency (RF) transceiver and/or interrogator 64 so data may be shared with and/or obtained from electronic devices in accordance with RF techniques. The mobile terminal may comprise other short-range transceivers, such as, for example, an infrared (IR) transceiver 66, a Bluetooth™ (BT) transceiver 68 operating using Bluetooth™ brand wireless technology developed by the Bluetooth™ Special Interest Group, a wireless universal serial bus (USB) transceiver 70 and/or the like. The Bluetooth™ transceiver 68 may be capable of operating according to ultra-low power Bluetooth™ technology (e.g., Wibree™) radio standards. In this regard, the mobile terminal 10 and, in particular, the short-range transceiver may be capable of transmitting data to and/or receiving data from electronic devices within a proximity of the mobile terminal, such as within 10 meters, for example. Although not shown, the mobile terminal may be capable of transmitting and/or receiving data from electronic devices according to various wireless networking techniques, including Wi-Fi, WLAN techniques such as IEEE 802.11 techniques, IEEE 802.15 techniques, IEEE 802.16 techniques, and/or the like.

In some example embodiments, the mobile terminal 10 may include a media capturing element, such as a camera, video and/or audio module, in communication with the processor 20. The media capturing element may be any means for capturing an image, video and/or audio for storage, display or transmission. For example, in an example embodiment in which the media capturing element is a camera module 36, the camera module 36 may include a digital camera capable of forming a digital image file from a captured image. In addition, the digital camera of the camera module 36 may be capable of capturing a video clip. As such, the camera module 36 may include all hardware, such as a lens or other optical component(s), and software necessary for creating a digital image file from a captured image as well as a digital video file from a captured video clip. Alternatively, the camera module 36 may include only the hardware needed to view an image, while a memory device of the mobile terminal 10 stores instructions for execution by the processor 20 in the form of software necessary to create a digital image file from a captured image. As yet another alternative, an object or objects within a field of view of the camera module 36 may be displayed on the display 28 of the mobile terminal 10 to illustrate a view of an image currently displayed which may be captured if desired by the user. As such, as referred to hereinafter, an image may be either a captured image or an image comprising the object or objects currently displayed by the mobile terminal 10, but not necessarily captured in an image file. In some example embodiments, the camera module 36 may further include a processing element such as a co-processor which assists the processor 20 in processing image data and an encoder and/or decoder for compressing and/or decompressing image data. The encoder and/or decoder may encode and/or decode according to, for example, a joint photographic experts group (JPEG) standard, a moving picture experts group (MPEG) standard, or other format.

The mobile terminal 10 may further include a positioning sensor 37. The positioning sensor 37 may include, for example, a global positioning system (GPS) sensor, an assisted global positioning system (Assisted-GPS) sensor, etc. In one embodiment, however, the positioning sensor 37 includes a pedometer, accelerometer, or inertial sensor. Further, the positioning sensor may determine the location of the mobile terminal 10 based upon signal triangulation or other mechanisms. The positioning sensor 37 may be configured to determine a location of the mobile terminal 10, such as latitude and longitude coordinates of the mobile terminal 10 or a position relative to a reference point such as a destination or a start point. Information from the positioning sensor 37 may be communicated to a memory of the mobile terminal 10 or to another memory device to be stored as a position history or location information. Furthermore, the memory of the mobile terminal 10 may store instructions for determining cell id information. In this regard, the memory may store an application program for execution by the processor 20, which may determine an identity of the current cell (e.g., cell id identity or cell id information) with which the mobile terminal 10 is in communication. In conjunction with the positioning sensor 37, the cell id information may be used to more accurately determine a location of the mobile terminal 10.

In some example embodiments, the positioning sensor 37 may comprise an accelerometer, inertial sensor, and/or pedometer, which may be used to determine a state of motion, a trajectory of motion, and/or the like of the mobile terminal 10. In some embodiments where the positioning sensor comprises a GPS sensor or the like, a state of motion, trajectory of motion, and/or the like of the mobile terminal 10 may also be determined. In this regard, the positioning sensor may be configured to determine whether the mobile terminal 10 is in motion based upon whether the location of the mobile terminal 10 is changing over an interval of time. In some example embodiments, the positioning sensor 37 may be configured to determine a degree or severity of this state of motion based upon, for example, the distance traveled by the mobile terminal 10 over a time interval, an angle of a trajectory of motion of the mobile terminal 10, and/or the like.

The mobile terminal 10 may comprise memory, such as a subscriber identity module (SIM) 38, a removable user identity module (R-UIM), and/or the like, which may store information elements related to a mobile subscriber. In addition to the SIM, the mobile terminal may comprise other removable and/or fixed memory. The mobile terminal 10 may include volatile memory 40 and/or non-volatile memory 42. For example, volatile memory 40 may include Random Access Memory (RAM) including dynamic and/or static RAM, onchip or off-chip cache memory, and/or the like. Non-volatile memory 42, which may be embedded and/or removable, may include, for example, read-only memory, flash memory, magnetic storage devices (e.g., hard disks, floppy disk drives, magnetic tape, etc.), optical disc drives and/or media, non-volatile random access memory (NVRAM), and/or the like. Like volatile memory 40 non-volatile memory 42 may include a cache area for temporary storage of data. The memories may store one or more software programs, instructions, pieces of information, data, and/or the like which may be used by the mobile terminal for performing functions of the mobile terminal. For example, the memories may comprise an identifier, such as an international mobile equipment identification (IMEI) code, capable of uniquely identifying the mobile terminal 10.

Returning to FIG. 1, in an example embodiment, the augmented reality apparatus 102 includes various means for performing the various functions herein described. These means may comprise one or more of a processor 110, memory 112, communication interface 114, user interface 116, augmented reality (AR) control circuitry 118, camera module 120, or positioning sensor 122. The means of the augmented reality apparatus 102 as described herein may be embodied as, for example, circuitry, hardware elements (e.g., a suitably programmed processor, combinational logic circuit, and/or the like), a computer program product comprising a computer-readable medium (e.g. memory 112) storing computer-readable program instructions (e.g., software or firmware) that is executable by a suitably configured processing device (e.g., the processor 110), or some combination thereof.

In some example embodiments, one or more of the means illustrated in FIG. 1 may be embodied as a chip or chip set. In other words, the augmented reality apparatus 102 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. In this regard, the processor 110, memory 112, communication interface 114, user interface 116, augmented reality control circuitry 118, camera module 120, and/or positioning sensor 122 may be embodied as a chip or chip set. The augmented reality apparatus 102 may therefore, in some example embodiments, be configured to implement embodiments of the present invention on a single chip or as a single "system on a chip." As another example, in some example embodiments, the augmented reality apparatus 102 may comprise component(s) configured to implement embodiments of the present invention on a single chip or as a single "system on a chip." As such, in some cases, a chip or chipset may constitute means for performing one or more operations for providing the functionalities described herein and/or for enabling user interface navigation with respect to the functionalities and/or services described herein.

The processor 110 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 1 as a single processor, in some embodiments the processor 110 comprises a plurality of processors. The plurality of processors may be in operative communication with each other and may be collectively configured to perform one or more functionalities of the augmented reality apparatus 102 as described herein. The plurality of processors may be embodied on a single computing device or distributed across a plurality of computing devices collectively configured to function as the augmented reality apparatus 102. In embodiments wherein the augmented reality apparatus 102 is embodied as a mobile terminal 10, the processor 110 may be embodied as or comprise the processor 20. In some example embodiments, the processor 110 may be configured to execute instructions, such as may be stored in the memory 112 or in a location otherwise accessible to the processor 110. These instructions, when executed by the processor 110, may cause the augmented reality apparatus 102 to perform one or more of the functionalities of the augmented reality apparatus 102 as described herein. As such, whether configured by hardware or software methods, or by a combination thereof, the processor 110 may comprise an entity capable of performing operations according to embodiments while configured accordingly. Thus, for example, when the processor 110 is embodied as an ASIC, FPGA or the like, the processor 110 may comprise specifically configured hardware for conducting one or more operations described herein. Alternatively, as another example, when the processor 110 is embodied as an executor of instructions, such as may be stored in the memory 112, the instructions may specifically configure the processor 110 to perform one or more algorithms and operations described herein.

The memory 112 may comprise, for example, volatile memory, non-volatile memory, or some combination thereof. In this regard, the memory 112 may comprise a non-transitory computer-readable storage medium. Although illustrated in FIG. 1 as a single memory, the memory 112 may comprise a plurality of memories. The plurality of memories may be embodied on a single computing device or may be distributed across a plurality of computing devices collectively configured to function as the augmented reality apparatus 102. In various example embodiments, the memory 112 may comprise a hard disk, random access memory, cache memory, flash memory, a compact disc read only memory (CD-ROM), digital versatile disc read only memory (DVD-ROM), an optical disc, circuitry configured to store information, or some combination thereof. In some embodiments wherein the augmented reality apparatus 102 is embodied as a mobile terminal 10, the memory 112 may comprise the volatile memory 40 and/or the non-volatile memory 42. The memory 112 may be configured to store information, data, applications, instructions, or the like for enabling the augmented reality apparatus 102 to carry out various functions in accordance with various example embodiments. For example, in some example embodiments, the memory 112 is configured to buffer input data for processing by the processor 110. Additionally or alternatively, the memory 112 may be configured to store program instructions for execution by the processor 110. The memory 112 may store information in the form of static and/or dynamic information. This stored information may be stored and/or used by the augmented reality control circuitry 118 during the course of performing its functionalities.

The communication interface 114 may be embodied as any device or means embodied in circuitry, hardware, a computer program product comprising a computer readable medium (e.g., the memory 112) storing computer readable program instructions that are executable by a processing device (e.g., the processor 110), or a combination thereof that is configured to receive and/or transmit data from/to another computing device. In an example embodiment, the communication interface 114 is at least partially embodied as or otherwise controlled by the processor 110. In this regard, the communication interface 114 may be in communication with the processor 110, such as via a bus. The communication interface 114 may include, for example, an antenna, a transmitter, a receiver, a transceiver and/or supporting hardware or software for enabling communications with one or more remote computing devices. The communication interface 114 may be configured to receive and/or transmit data using any protocol that may be used for communications between computing devices. In this regard, the communication interface 114 may be configured to receive and/or transmit data using any protocol that may be used for transmission of data over a wireless network, wireline network, some combination thereof, or the like by which the augmented reality apparatus 102 and one or more computing devices may be in communication. As an example, the communication interface 114 may be configured to receive and/or transmit content over a network (e.g., the network 306 illustrated in FIG. 3) from/to an entity, such as the augmentation source 304 illustrated in FIG. 3. The communication interface 114 may additionally be in communication with the memory 112, user interface 116, augmented reality control circuitry 118, camera module 120, and/or positioning sensor 122, such as via a bus.

The user interface 116 may be in communication with the processor 110 to receive an indication of a user input and/or to provide an audible, visual, mechanical, or other output to a user. As such, the user interface 116 may include, for example, a keyboard, a mouse, a joystick, a display, a touch screen display, a microphone, a speaker, and/or other input/output mechanisms. In embodiments wherein the user interface 116 comprises a touch screen display, the user interface 116 may additionally be configured to detect and/or receive indication of a touch gesture or other input to the touch screen display. The user interface 116 may be in communication with the memory 112, communication interface 114, augmented reality control circuitry 118, camera module 120, and/or positioning sensor 122, such as via a bus.

The augmented reality (AR) control circuitry 118 may be embodied as various means, such as circuitry, hardware, a computer program product comprising a computer readable medium (e.g., the memory 112) storing computer readable program instructions that may be executed by a processing device (e.g., the processor 110), or some combination thereof and, in some embodiments, is embodied as or otherwise controlled by the processor 110. In embodiments wherein the augmented reality control circuitry 118 is embodied separately from the processor 110, the augmented reality control circuitry 118 may be in communication with the processor 110. The augmented reality control circuitry 118 may further be in communication with one or more of the memory 112, communication interface 114, user interface 116, camera module 120, or positioning sensor 122, such as via a bus.

The camera module 120 may be embodied as various means, such as circuitry, hardware, a computer program product comprising computer readable program instructions stored on a computer readable medium (e.g., the memory 112) and executed by a processing device (e.g., the processor 110), or some combination thereof and, in some embodiments, is embodied as or otherwise controlled by the processor 110. The camera module 120 may be configured to control an image capture device embodied on or in operative communication with the augmented reality apparatus 102. Additionally or alternatively, the camera module 120, itself, may comprise an image capture device. Accordingly, the camera module 120 may be configured to capture and/or control the capture of images, video, and/or the like that may be used in providing a real world view used in an augmented reality display. In embodiments wherein the augmented reality apparatus 102 is embodied as a mobile terminal 10, the camera module 120 may comprise and/or may be configured to control the camera module 36. As another example, in some embodiments wherein the augmented reality apparatus is not embodied as a mobile terminal 10, the camera module 120 may be embodied as an entity and/or configured to control an entity substantially similar to the camera module 36. The camera module 120 may further be in communication with one or more of the memory 112, communication interface 114, user interface 116, augmented reality control circuitry 118, or positioning sensor 122, such as via a bus. In some embodiments, however, aspects of the camera module 120 may be scaled back or the camera module 120 may even be eliminated. Accordingly, it will be appreciated that the camera module 120 is illustrated in FIG. 1 by way of example and not by way of limitation, as in some embodiments, the augmented reality apparatus 102 may not include a camera module 120.

The positioning sensor 122 may be embodied as various means, such as circuitry, hardware, a computer program product comprising a computer readable medium (e.g., the memory 112) storing computer readable program instructions stored that may be executed by a processing device (e.g., the processor 110), or some combination thereof and, in some embodiments, is embodied as or otherwise controlled by the processor 110. The positioning sensor 122 may be configured to determine a trajectory of motion of the augmented reality apparatus 102. In this regard, the positioning sensor 122 may comprise and/or be configured to collect data from an accelerometer, inertial sensor, gyroscope, pedometer, and/or the like to determine a state of motion, a trajectory of motion, a severity of motion, and/or the like. In some example embodiments, the augmented reality control circuitry 118 may be configured to use information about a motion of the augmented reality apparatus 102 as determined by the positioning sensor 122 to control activation of an augmented reality mode. The positioning sensor 122 may additionally or alternatively be configured to determine and/or estimate a position or location of the augmented reality apparatus 102 (e.g., latitude and longitude coordinates of the augmented reality apparatus 102, a position relative to a reference point such as a destination or a start point of the augmented reality apparatus 102, a street address of the augmented reality apparatus 102, and/or the like). In this regard, the positioning sensor 122 may comprise and/or be configured to collect data from a GPS sensor, assisted GPS sensor, and/or other entity configured to ascertain a position of the augmented reality apparatus 102. In embodiments wherein the augmented reality apparatus 102 is embodied as a mobile terminal 10, the positioning sensor 122 may comprise and/or may be configured to control the positioning sensor 37. As another example, in some embodiments wherein the augmented reality apparatus is not embodied as a mobile terminal 10, the positioning sensor 122 may be embodied as an entity and/or configured to control an entity substantially similar to the positioning sensor 37. The positioning sensor 122 may further be in communication with one or more of the memory 112, communication interface 114, user interface 116, augmented reality control circuitry 118, or camera module 120, such as via a bus. In some embodiments, however, aspects of the positioning sensor 122 may be scaled back or the positioning sensor 122 may even be eliminated. Accordingly, it will be appreciated that the positioning sensor 122 is illustrated in FIG. 1 by way of example and not by way of limitation, as in some embodiments, the augmented reality apparatus 102 may not include a positioning sensor 122.

Figure 3:
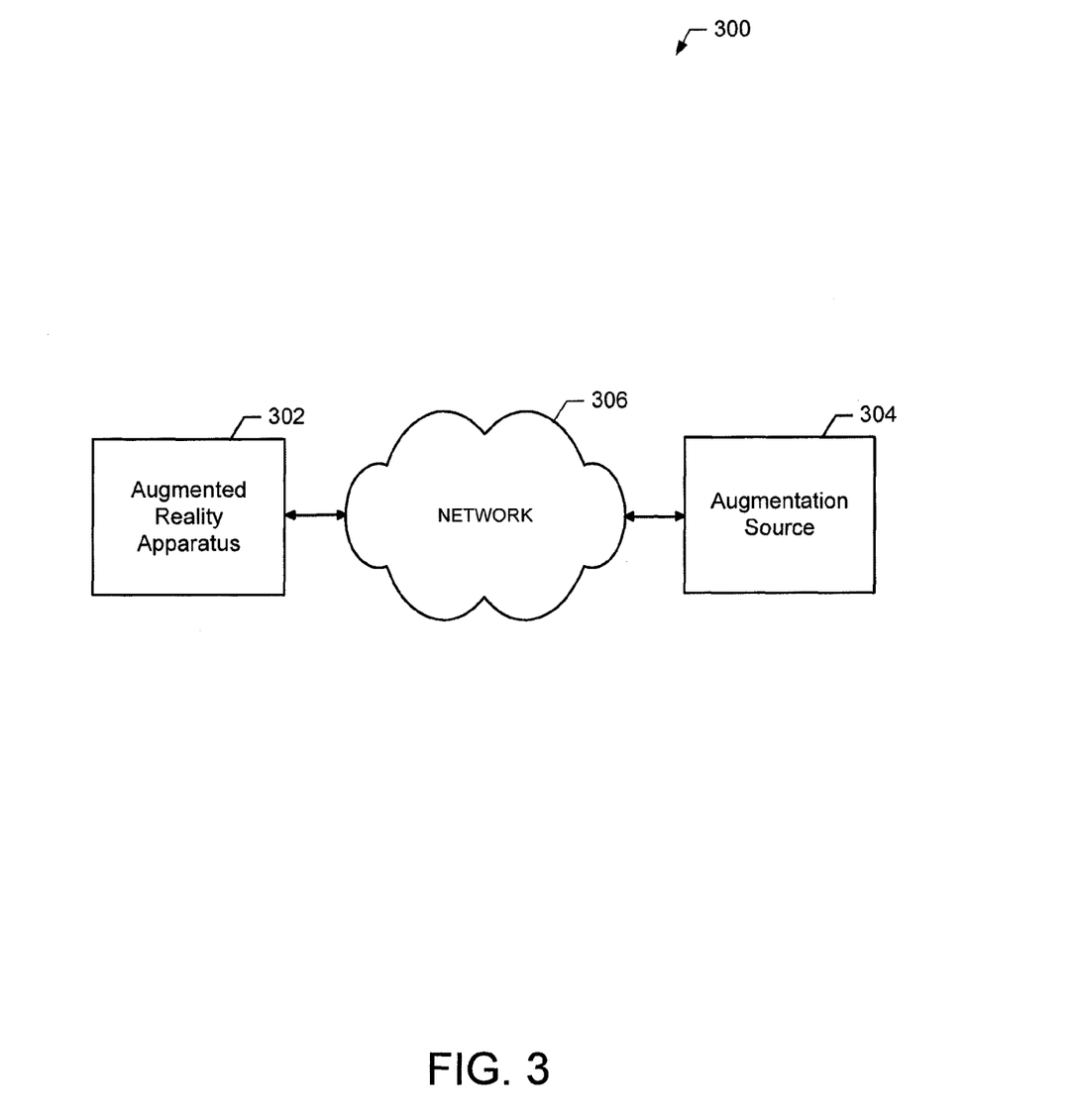
FIG. 3 illustrates a system for restricting overlay of an augmentation according to some example embodiments.

FIG. 3 illustrates a system 300 for restricting overlay of an augmentation according to some example embodiments. The system 300 may comprise an augmented reality apparatus 302 and an augmentation source 304 configured to communicate over the network 306. The augmented reality apparatus 302 may, for example, comprise an embodiment of the augmented reality apparatus 102 wherein the augmented reality apparatus 102 is configured to communicate with a remote augmentation source 304 over a network 306, such as to access support for evaluating an image for presence of a predefined feature pattern, which may be provided by an augmentation source 304 in accordance with some example embodiments. The augmentation source 304 may comprise, for example, a server, network node, a desktop computer, laptop computer, mobile terminal, mobile computer, mobile phone, mobile communication device, audio/video player, any combination thereof, and/or the like. The network 306 may comprise a wireline network, wireless network (e.g., a cellular network, wireless local area network, wireless wide area network, some combination thereof, or the like), or a combination thereof, and in one embodiment comprises the internet.

In some example embodiments, the augmented reality apparatus 302 may be configured to provide an image and/or a feature space representation thereof to the augmentation source 304 for evaluation of the image and/or feature space representation thereof for presence of a predefined feature pattern. In such embodiments wherein the augmentation source 304 may be provided with an image and/or feature space representation thereof for evaluation, the augmentation source 304 may be configured to inform the augmented reality apparatus 302 in an instance in which a predefined feature pattern is recognized.

Additionally or alternatively, the augmented reality apparatus 302 may be configured to provide details of a feature pattern detected in an image to the augmentation source 304 such that the augmentation source 304 may determine whether the feature pattern detected in the image corresponds to a predefined feature pattern. The augmentation source 304 may accordingly be configured to inform the augmented reality apparatus 302 whether the detected feature pattern corresponds to a predefined feature pattern.

Additionally or alternatively, in some example embodiments, the augmentation source 304 may be configured to maintain a database of predefined feature patterns and/or a database of real world locations in which predefined feature patterns may exist. In such example embodiments, the augmented reality apparatus 302 may be configured to consult such a database that may be maintained by an augmentation source 304 to facilitate evaluation of a feature space representation of an image for presence of a predefined feature pattern and/or to facilitate validation of a recognized predefined feature pattern based at least in part on a location at which an image was captured.

As such, in view of the foregoing discussion of FIG. 3, it will be appreciated that aspects of the augmented reality control circuitry 118 illustrated in FIG. 1 may be embodied on an apparatus on which a user may view an augmented reality view of his or her surroundings, such as an augmented reality apparatus 102, augmented reality apparatus 302, and/or the like. Additionally or alternatively, aspects of the augmented reality control circuitry 118 may be embodied on a devices remote from an apparatus on which a user may view an augmented reality view of his or her surroundings, such as on an augmentation source 304 or other computing device that may be accessed over a network such as the network 306. As still a further example, aspects of the augmented reality control circuitry 118 may be distributed over both an apparatus on which a user may view an augmented reality view of his or her surroundings (e.g., an augmented reality apparatus 102, augmented reality apparatus 302, and/or the like) and a network accessible apparatus that may be configured to facilitate augmentation of an image (e.g., an augmentation source 304). As such, it will be appreciated that operations attributed to the augmented reality control circuitry 118 may be performed locally at the augmented reality apparatus 102 and/or may be performed by and/or with the assistance of a remote network-accessible apparatus, such as the augmentation source 304.

In some example embodiments, the camera module 120 may be configured to capture an image of "real world" surroundings of the augmented reality apparatus 102. Capture of the image may, for example, be under the control of the augmented reality circuitry 118. The captured image may, for example, comprise a captured still image. As another example, the captured image may comprise a video. As still a further example, the camera module 120 may be configured to capture a series of still images, such as at regular intervals from each other, which may be displayed at a frame rate sufficient to approximate a video.

The augmented reality control circuitry 118 may be configured to augment an image captured by the camera module 120. In this regard, the augmented reality control circuitry 118 may be configured to overlay one or more augmentations on a captured image (e.g., on a captured still image, on a video stream, on one or more frames of video, and/or the like). The augmented image may be displayed in an augmented reality view, such as on a display of the user interface 116.

In some example embodiments, the augmented reality control circuitry 118 may be configured to transform a captured image (e.g., a still image, video stream, one or more frames of video, and/or the like) into a feature space representation of the image. The feature space representation of the image may, for example, comprise a plurality of feature points. The augmented reality control circuitry 118 may be further configured to evaluate a feature space representation of an image for presence of a predefined feature pattern. Transformation of the image into a feature space representation and/or evaluation of the feature space representation may be performed using one or more computer vision techniques that may be used for feature detections such as, for example, FAST Corner Detection.

In some example embodiments wherein the captured image comprises a video stream, the augmented reality control circuitry 118 may, for example, be configured to continuously transform the video stream into a feature space representation and evaluate the feature space representation. As another example, the augmented reality control circuitry 118 may be configured to periodically (e.g., every n frames, every n milliseconds, and/or the like) transform a video frame into a feature space representation and evaluate the feature space representation. As yet another example, the augmented reality control circuitry 118 may be configured to determine that a field of view of the camera module 120 has changed and may be configured to transform an image captured by the camera module 120 to a feature space representation and evaluate the feature space representation responsive to the detected change in the field of view.

The predefined feature pattern for which the augmented reality control circuitry 118 may evaluate may comprise any pattern of one or more feature points that may be integrated into a real world object (e.g., a real world image, architectural feature, and/or the like) in a manner that it may be recognizable through computer vision techniques, but may not perceptibly alter the object to the human eye.

In accordance with some example embodiments, presence of the predefined feature pattern may impart restrictions on augmentation of an image capturing the predefined feature pattern. Accordingly, for example, an entity may integrate the feature pattern into a real world object to restrict augmentation of an image capturing the object in an augmented reality view. By way of example, the predefined feature pattern may be integrated into an advertisement, logo, and/or the like in order to restrict overlay of an augmentation on the advertisement or logo.

In some example embodiments, there may be multiple predefined feature patterns, which may impart restrictions on augmentation. In some such example embodiments, different respective predefined feature patterns may impart different respective restrictions on augmentation. In such example embodiments, the augmented reality control circuitry 118 may be configured to consult a database of predefined feature patterns to evaluate a feature space representation of an image for presence of a predefined feature pattern. The database may, for example, be maintained and/or cached locally, such as in the memory 112. Additionally or alternatively, the database may be maintained at a remote network-accessible site, such as on an augmentation source 304, which may be accessed by the augmented reality control circuitry 118.

In some example embodiments, the augmented reality control circuitry 118 may be configured to use one or more image scaling techniques, such as image pyramidization, to facilitate evaluation of a feature space representation of an image for presence of a predefined feature pattern. In this regard, for example, the augmented reality control circuitry 118 may be configured to evaluate a feature space representation for multiple scaled versions of a predefined feature pattern. Additionally or alternatively, the augmented reality control circuitry 118 may be configured to evaluate a feature space representation of an image at multiple scales for a given predefined feature pattern. Such scaling techniques may facilitate recognition of presence of a feature pattern. In this regard, a size of a captured feature pattern may vary due to various image capture factors, such as a distance from the real world object including the feature pattern, a zoom used for capture of the real world object, and/or the like. Accordingly, use of scaling in some example embodiments may facilitate recognition of a feature pattern even in an instance in which the size of a captured feature pattern differs from a size of a predefined feature pattern that may be used for evaluation.

In an instance in which the augmented reality control circuitry 118 recognizes, based at least in part on evaluation of a feature space representation of an image, that a predefined feature pattern is present in the feature space representation of the image, the augmented reality control circuitry 118 may be configured to restrict overlay of an augmentation on a portion of the image corresponding to the recognized predefined feature pattern. Restriction of overlay of an augmentation may, for example, comprise prohibition of overlay of an augmentation on the portion of the image corresponding to the recognized predefined feature pattern. As a further example, restriction of overlay of an augmentation may, for example, comprise making augmentations overlaying a portion of the image corresponding to the recognized predefined feature pattern semi-transparent.

As another example, in instances in which a respective predefined feature pattern imparts a set of one or more restrictions, overlay of an augmentation on a portion of the image corresponding to the recognized predefined feature pattern may be restricted in accordance with the set of restrictions imparted by the recognized feature pattern. For example, there may be a predefined feature pattern that is integrated only into a logo for a certain company. The feature pattern integrated into the company's logo may impart a restriction of overlay of an augmentation on the company's logo to an augmentation including an advertisement for a product of the company. The augmented reality control circuitry 118 may accordingly be configured in some example embodiments to determine a set of restrictions imparted by a recognized predefined feature pattern and restrict overlay of an augmentation on a portion of the image corresponding to the recognized feature pattern in accordance with the imparted set of restrictions.

In some example embodiments, restriction of overlay of an augmentation on the portion of the image corresponding to a recognized predefined feature pattern may apply to an entire image. For example, in such embodiments if a predefined feature pattern is recognized in a field of view, overlay of an augmentation may be prohibited for the entire field of view. As an example, an image may comprise video of a television broadcast, and a predefined feature pattern may be integrated into logo of a main broadcast sponsor captured in the video. In response to recognition of the predefined feature pattern, advertisements overlaid on the video for minor sponsors may be removed and/or prohibited.

Alternatively, restriction of overlay of an augmentation on the portion of the image corresponding to a recognized predefined feature pattern may apply only to a portion of the image corresponding to a position of the predefined feature pattern. The augmented reality control circuitry 118 may accordingly be configured in some example embodiments to determine the portion of the image on which overlay of an augmentation is restricted based at least in part on a position of the recognized predefined feature pattern and restrict overlay of an augmentation on the determined portion of the image.

In some example embodiments, the portion of the image on which overlay of an augmentation is restricted may coincide with a size of the recognized predefined feature pattern. In this regard, the restricted portion of the image may be coextensive with an area occupied by the recognized predefined feature pattern. The augmented reality control circuitry 118 may accordingly be configured in some example embodiments to determine the portion of the image occupied by the recognized predefined feature pattern and restrict overlay of an augmentation on the portion of the image occupied by the recognized predefined feature pattern.

As another example, in some example embodiments, the portion of the image on which overlay of an augmentation is restricted may include a buffer region extending beyond the portion of the image occupied by the recognized predefined feature pattern. The buffer region may, for example, comprise an extension of the area occupied by the recognized predefined feature pattern by a predefined number of pixels (e.g., forming a border around the perimeter of the area occupied by the recognized predefined feature pattern), an area that is a multiple of a size of the recognized predefined feature pattern, or the like. The augmented reality control circuitry 118 may accordingly be configured in some example embodiments to determine a buffer region extending beyond the portion of the image occupied by the recognized predefined feature pattern and restrict overlay of an augmentation on a portion of the image comprising the portion of the image occupied by the recognized predefined feature pattern and the buffer region.

In some example embodiments, a predefined feature pattern may be repeated multiple times throughout a real world object. The augmented reality control circuitry 118 may accordingly be configured in such example embodiments to recognize the multiple instances of the predefined feature pattern and restrict overlay of an augmentation on a portion of the image corresponding to the recognized predefined feature patterns.

In some example embodiments, augmentation of a portion of the image lying outside of the boundaries of the portion of the image corresponding to the recognized predefined feature pattern may not be restricted. Accordingly, in some example embodiments, the augmented reality control circuitry 118 may be configured to permit and/or cause overlay of an augmentation (e.g., without restriction) on one or more portions of the image other than the portion of the image on which overlay of an augmentation is restricted.

In some instances, it is possible that an augmentation overlaid on an portion of the image lying outside of the boundaries of the portion of the image corresponding to the recognized predefined feature pattern (e.g., the portion of the image on which overlay of an augmentation is restricted) may overlap a portion of the portion of the image on which overlay of an augmentation is restricted. This scenario may be handled in a variety of manners by various example embodiments. For example, in some example embodiments, display of any augmentation that may occlude any portion of the portion of the image on which overlay of an augmentation is restricted may be restricted in accordance with the restrictions applicable to the restricted image portion (e.g., prohibited). As another example, in some example embodiments, if an augmentation overlaid to a portion of the image outside of the portion of the image on which overlay of an augmentation is restricted extends over a portion of the restricted portion, the overlapping portion may be cropped such that it is not visible, or may be made semi-transparent, translucent, or the like such that the underlying image is at least partially visible. As still a further example, display of the overlapping augmentation may not be restricted or otherwise altered provided that the area of occlusion of the restricted image portion does not occlude more than a threshold portion of the restricted portion.

In some example embodiment's, augmentations that were already purposefully triggered may not be affected by recognizing new predefined features in images captured as the image capturing device (e.g., the augmented reality apparatus 102) is moved or rotated. For example, an overlaid augmentation may be three-dimensional such that the augmentation may be viewed from multiple angles by moving the image capturing device around the virtual object. As the image capturing device is rotated, it is possible that an image including a predefined feature pattern may be captured. The predefined feature pattern may restrict overlay of an augmentation on a portion of the image that may include at least a portion of the existing three-dimensional augmentation. However, as the three-dimensional augmentation is preexisting, and the focus of the user may be on the existing three-dimensional augmentation rather than the restricted portion of the image, the augmentation may not be altered in response to recognizing the predefined feature pattern as the image capturing device is rotated in some example embodiments.

In some example embodiments, the augmented reality control circuitry 118 may be configured to forbid display of a portion of a captured image corresponding to a recognized predefined feature pattern. For example, a blacked out region may be displayed in place of a captured real world object including a predefined feature pattern.

In some example embodiments, the augmented reality control circuitry 118 may be configured to withhold sensory information from one or more applications in response to recognizing a predefined feature pattern. For example, position information, orientation information, and/or the like may be withheld from an application for augmenting a captured image to inhibit augmentation of the image containing the recognized predefined feature pattern.

In some example embodiments, the augmented reality control circuitry 118 may be configured to confirm a validity of a recognized predefined feature pattern prior to restricting overlay of an augmentation on an image including the recognized predefined feature pattern. For example, in some example embodiments, a predefined number of predefined feature patterns may be integrated into a real world object. If the augmented reality control circuitry 118 fails to recognize this predefined number of feature patterns in a captured image, the augmented reality control circuitry 118 may regard a recognized instance of the predefined feature pattern as a false positive rather than taking action to restrict augmentation.

As another example, existence of a predefined feature pattern in the real world may be registered with a service that may include a database of known feature patterns and their respective real world locations. For example, a company may place an advertisement containing an integrated predefined feature pattern on a billboard, and may register the location of the billboard. In such example embodiments, the augmented reality control circuitry 118 may accordingly be configured to consult the database based at least in part on a location at which an image was captured, such as may be determined with the assistance of the positioning sensor 122, to determine whether a recognized predefined feature pattern is valid. If the augmented reality control circuitry 118 determines that a feature pattern is not registered for the location at which the image was captured, the augmented reality control circuitry 118 regard a recognized instance of the predefined feature pattern as a false positive rather than taking action to restrict augmentation.

In some example embodiments, a subscription service may be implemented, which may allow advertisers and/or other entities to register real world implementations of predefined feature patterns. Thus, for example, if an entity's subscription, or term of service, expires, an instance of the entity's predefined feature pattern may be removed from and/or marked as expired within a database of known feature patterns. Accordingly, in such example embodiments, the augmented reality control circuitry 118 may consult a database to determine whether a recognized feature pattern is a valid feature pattern registered with the subscription service. If the augmented reality control circuitry 118 determines that the recognized feature pattern is not registered with the subscription service or has expired, the augmented reality control circuitry 118 may ignore the predefined feature pattern and takes no action to restrict augmentation.

In some example embodiments in which a location of a feature pattern is registered, the registration may include a corresponding set of restrictions for augmentation overlay. For example, the restriction may specify an area corresponding to the feature pattern for which overlay of an augmentation may be restricted. Accordingly, the set of restrictions may be provided to the augmented reality apparatus 102 in response to the augmented reality control circuitry 118 consulting a database of registered predefined feature patterns based at least in part on a location at which an image containing a predefined feature pattern was captured (e.g., to determine whether the recognized predefined feature pattern is valid). The augmented reality control circuitry 118 may accordingly be configured to restrict overlay of an augmentation on a portion of the image corresponding to the recognized predefined feature pattern based at least in part on the registered set of restrictions. For example, the set of restrictions may specify the area corresponding to the predefined feature pattern for which overlay of an augmentation is restricted. The augmented reality control circuitry 118 may accordingly be configured to restrict overlay of an augmentation on the specified area.

Figure 4:
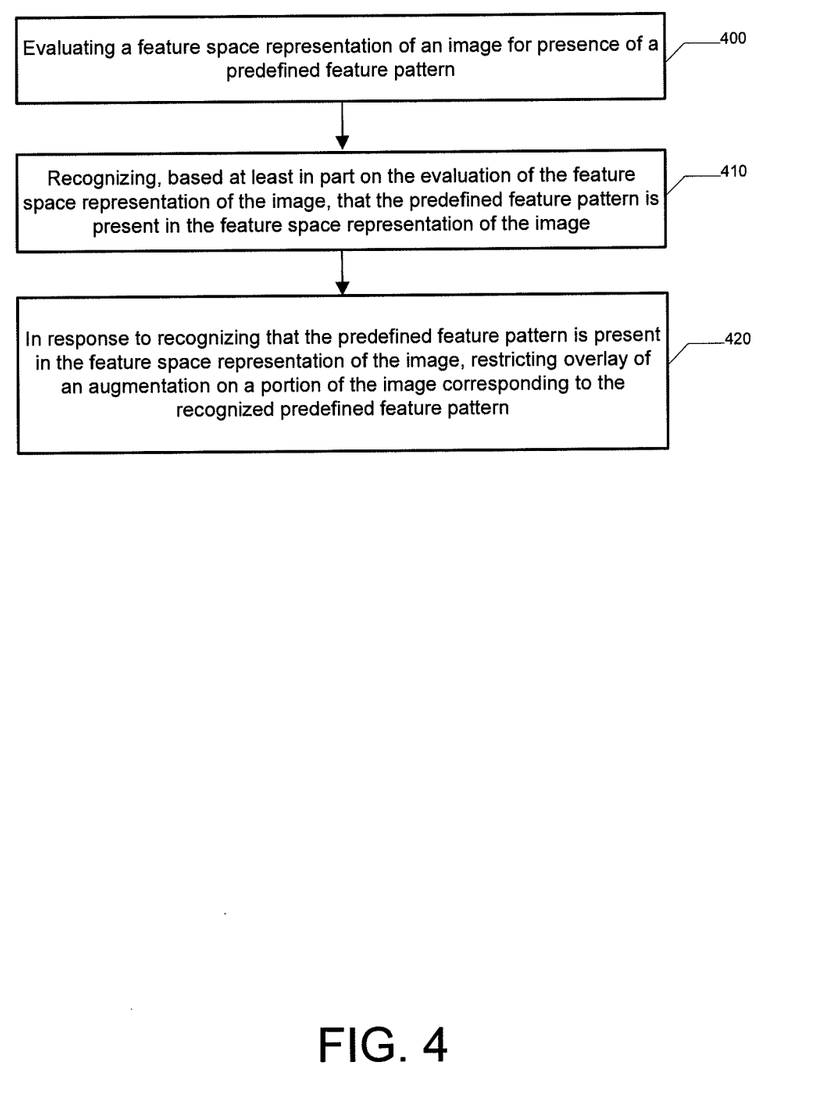
FIG. 4 illustrates a flowchart according to an example method for restricting overlay of an augmentation according to some example embodiments.

FIG. 4 illustrates a flowchart according to an example method for restricting overlay of an augmentation according to some example embodiments. The operations illustrated in and described with respect to FIG. 4 may, for example, be performed by, with the assistance of, and/or under the control of one or more of the processor 110, memory 112, communication interface 114, user interface 116, augmented reality control circuitry 118, camera module 120, or positioning sensor 122. Operation 400 may comprise evaluating a feature space representation of an image for presence of a predefined feature pattern. The processor 110, memory 112, communication interface 114, augmented reality control circuitry 118, camera module 120, and/or positioning sensor 122 may, for example, provide means for performing operation 400. Operation 410 may comprise recognizing, based at least in part on the evaluation of the feature space representation of the image, that the predefined feature pattern is present in the feature space representation of the image. The processor 110, memory 112, communication interface 114, augmented reality control circuitry 118, camera module 120, and/or positioning sensor 122 may, for example, provide means for performing operation 410. Operation 420 may comprise, in response to recognizing that the predefined feature pattern is present in the feature space representation of the image, restricting overlay of an augmentation on a portion of the image corresponding to the recognized predefined feature pattern. The processor 110, memory 112, user interface 116, and/or augmented reality control circuitry 118 may, for example, provide means for performing operation 420.

FIG. 4 illustrates a flowchart of a system, method, and computer program product according to an example embodiment. It will be understood that each block of the flowchart, and combinations of blocks in the flowchart, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by one or more memory devices of a mobile terminal, server, or other computing device (for example, in the memory 112) and executed by a processor in the computing device (for example, by the processor 110). In some embodiments, the computer program instructions comprising the computer program product(s) which embody the procedures described above may be stored by memory devices of a plurality of computing devices. As will be appreciated, any such computer program product may be loaded onto a computer or other programmable apparatus (for example, an augmented reality apparatus 102) to produce a machine, such that the computer program product including the instructions which execute on the computer or other programmable apparatus creates means for implementing the functions specified in the flowchart block(s). Further, the computer program product may comprise one or more computer-readable memories on which the computer program instructions may be stored such that the one or more computer-readable memories can direct a computer or other programmable apparatus to function in a particular manner, such that the computer program product comprises an article of manufacture which implements the function specified in the flowchart block(s). The computer program instructions of one or more computer program products may also be loaded onto a computer or other programmable apparatus (for example, an augmented reality apparatus 102) to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions. It will also be understood that one or more blocks of the flowchart, and combinations of blocks in the flowchart, may be implemented by special purpose hardware-based computer systems which perform the specified functions, or combinations of special purpose hardware and computer program product(s).

The above described functions may be carried out in many ways. For example, any suitable means for carrying out each of the functions described above may be employed to carry out embodiments of the invention. In one embodiment, a suitably configured processor (for example, the processor 110) may provide all or a portion of the elements. In another embodiment, all or a portion of the elements may be configured by and operate under control of a computer program product. The computer program product for performing the methods of embodiments of the invention includes a computer-readable storage medium (for example, the memory 112), such as the non-volatile storage medium, and computer-readable program code portions, such as a series of computer instructions, embodied in the computer-readable storage medium.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

What is claimed is:

1. A method comprising:

evaluating, by a computer processor, a feature space representation of an image for a presence of a predefined feature pattern, the predefined feature pattern having been integrated into a first image or an object and the image captures the first image or the object through augmented reality, wherein the predefined feature pattern is recognizable through a computer vision technique;

recognizing, based at least in part on the evaluating, that the predefined feature pattern is present in the feature space representation of the image by mapping the predefined feature pattern to an entry within a feature pattern database, the feature pattern database comprising a plurality of predefined feature patterns;

determining a respective restriction type from among a plurality of restriction types, the respective restriction type associated with the recognized predefined feature pattern in the feature pattern database; and in response to recognizing that the predefined feature pattern is present in the feature space representation of the image, restricting overlay of an augmentation on a portion of the image corresponding to the recognized predefined feature pattern according to the determined at least one augmentation restriction type.

2. The method of claim 1, further comprising determining the portion of the image on which overlay of an augmentation is restricted based at least in part on a position of the recognized predefined feature pattern, and wherein restricting overlay comprises restricting overlay of an augmentation on the determined portion of the image.

3. The method of claim 2, wherein:

determining the portion of the image on which overlay of an augmentation is restricted based at least in part on the position of the recognized predefined feature pattern comprises determining the portion of the image occupied by the recognized predefined feature pattern; and restricting overlay comprises restricting overlay of an augmentation on the portion of the image occupied by the recognized predefined feature pattern.

4. The method of claim 2, wherein:

determining the portion of the image on which overlay of an augmentation is restricted based at least in part on the position of the recognized predefined feature pattern comprises determining the portion of the image occupied by the recognized predefined feature pattern and determining a buffer region extending beyond the portion of the image occupied by the recognized predefined feature pattern; and restricting overlay comprises restricting overlay of an augmentation on a portion of the image comprising the portion of the image occupied by the recognized predefined feature pattern and the buffer region.

5. The method of claim 1, further comprising causing overlay of an augmentation on at least one portion of the image other than the portion of the image on which overlay of an augmentation is restricted.

6. The method of claim 1, wherein the recognized predefined feature pattern is embedded in an advertisement captured in the image, and wherein restricting overlay of an augmentation on a portion of the image corresponding to the recognized predefined feature pattern comprises restricting overlay of an augmentation over the advertisement.

7. The method of claim 1, further comprising:

determining, based at least in part on a location at which the image was captured, whether the recognized predefined feature pattern is valid; and restricting overlay of an augmentation on a portion of the image corresponding to the recognized predefined feature pattern only in an instance in which it is determined that the recognized predefined feature pattern is valid.

8. The method of claim 1, wherein the image comprises a frame of a captured video stream.

9. An apparatus comprising at least one processor and at least one memory storing computer program code, wherein the at least one memory and stored computer program code are configured, with the at least one processor, to cause the apparatus to at least:

evaluate a feature space representation of an image for presence of a predefined feature pattern, the predefined feature pattern having been integrated into a first image or an object and the image captures the first image or the object through augmented reality, wherein the predefined feature pattern is recognizable through a computer vision technique;

recognize, based at least in part on the evaluation of the feature space representation of the image, that the predefined feature pattern is present in the feature space representation of the image by mapping the predefined feature pattern to an entry within a feature pattern database, the feature pattern database comprising a plurality of predefined feature patterns;

determine a respective restriction type from among a plurality of restriction types, the respective restriction type associated with the recognized predefined feature pattern in the feature pattern database; and in response to recognizing that the predefined feature pattern is present in the feature space representation of the image, restrict overlay of an augmentation on a portion of the image corresponding to the recognized predefined feature pattern according to the determined at least one augmentation restriction type.

10. The apparatus of claim 9, wherein the at least one memory and stored computer program code are configured, with the at least one processor, to further cause the apparatus to:

determine the portion of the image on which overlay of an augmentation is restricted based at least in part on a position of the recognized predefined feature pattern; and restrict overlay at least in part by restricting overlay of an augmentation on the determined portion of the image.

11. The apparatus of claim 10, wherein the at least one memory and stored computer program code are configured, with the at least one processor, to further cause the apparatus to:

determine the portion of the image on which overlay of an augmentation is restricted at least in part by determining the portion of the image occupied by the recognized predefined feature pattern; and restrict overlay at least in part by restricting overlay of an augmentation on the portion of the image occupied by the recognized predefined feature pattern.

12. The apparatus of claim 10, wherein the at least one memory and stored computer program code are configured, with the at least one processor, to further cause the apparatus to:

determine the portion of the image on which overlay of an augmentation is restricted at least in part by determining the portion of the image occupied by the recognized predefined feature pattern and determining a buffer region extending beyond the portion of the image occupied by the recognized predefined feature pattern; and restrict overlay at least in part by restricting overlay of an augmentation on a portion of the image comprising the portion of the image occupied by the recognized predefined feature pattern and the buffer region.

13. The apparatus of claim 9, wherein the at least one memory and stored computer program code are configured, with the at least one processor, to further cause the apparatus to cause overlay of an augmentation on at least one portion of the image other than the portion of the image on which overlay of an augmentation is restricted.

14. The apparatus of claim 9, wherein the recognized predefined feature pattern is embedded in an advertisement captured in the image, and wherein the at least one memory and stored computer program code are configured, with the at least one processor, to further cause the apparatus to restrict overlay of an augmentation on a portion of the image corresponding to the recognized predefined feature pattern at least in part by restricting overlay of an augmentation over the advertisement.

15. The apparatus of claim 9, wherein the at least one memory and stored computer program code are configured, with the at least one processor, to further cause the apparatus to:
   determine, based at least in part on a location at which the image was captured, whether the recognized predefined feature pattern is valid; and
   restrict overlay of an augmentation on a portion of the image corresponding to the recognized predefined feature pattern only in an instance in which it is determined that the recognized predefined feature pattern is valid.

16. The apparatus according to claim 9, wherein the apparatus comprises or is embodied on a mobile phone, the mobile phone comprising user interface circuitry and user interface software stored on one or more of the at least one memory; wherein the user interface circuitry and user interface software are configured to:
   facilitate user control of at least some functions of the mobile phone through use of a display; and
   cause at least a portion of a user interface of the mobile phone to be displayed on the display to facilitate user control of at least some functions of the mobile phone.

17. A computer program product comprising at least one non-transitory computer-readable storage medium having computer-readable program instructions stored therein, the computer-readable program instructions comprising:
   program instructions configured to evaluate a feature space representation of an image for presence of a predefined feature pattern, the predefined feature pattern having been integrated into a first image or an object and the image captures the first image or the object through augmented reality, wherein the predefined feature pattern is recognizable through a computer vision technique;
   program instructions configured to recognize, based at least in part on the evaluation of the feature space representation of the image, that the predefined feature pattern is present in the feature space representation of the image by mapping the predefined feature pattern to an entry within a feature pattern database, the feature pattern database comprising a plurality of predefined feature patterns;
   program instructions configured to determine a respective restriction type from among a plurality of restriction types, the respective restriction type associated with the recognized predefined feature pattern in the feature pattern database; and
   program instructions configured, in response to recognizing that the predefined feature pattern is present in the feature space representation of the image, to restrict overlay of an augmentation on a portion of the image corresponding to the recognized predefined feature pattern according to the determined at least one augmentation restriction type.

18. The computer program product according to claim 17, further comprising program instructions configured to determine the portion of the image on which overlay of an augmentation is restricted based at least in part on a position of the recognized predefined feature pattern, and wherein the program instructions configured to restrict overlay comprise instructions configured to restrict overlay of an augmentation on the determined portion of the image.

19. The computer program product according to claim 17, further comprising program instructions configured to cause overlay of an augmentation on at least one portion of the image other than the portion of the image on which overlay of an augmentation is restricted.

20. The method of claim 1, wherein restricting overlay of an augmentation on a portion of the image corresponding to the recognized predefined feature pattern according to the determined at least one augmentation restriction type further comprises:
   determining an augmentation associated with the recognized predefined feature pattern from among a plurality of augmentations; and
   displaying the augmentation on the recognized predefined feature pattern as an overlay over the predefined feature pattern.

* * * * *